US012781416B2

(12) United States Patent
Ohyagi et al.

(10) Patent No.: US 12,781,416 B2
(45) Date of Patent: Nov. 3, 2026

(54) WATER SOFTENING DEVICE AND WASHING MACHINE

(71) Applicant: SAMSUNG ELECTRONICS CO., LTD., Suwon-si (KR)

(72) Inventors: Atsushi Ohyagi, Yokohama (JP); Hitoshi Minai, Yokohama (JP); Tomoyuki Okuno, Yokohama (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 101 days.

(21) Appl. No.: 19/012,334

(22) Filed: Jan. 7, 2025

(65) Prior Publication Data

US 2025/0146204 A1 May 8, 2025

Related U.S. Application Data

(63) Continuation of application No. PCT/KR2023/005529, filed on Apr. 24, 2023.

(30) Foreign Application Priority Data

Jul. 12, 2022 (JP) ................................ 2022-111713

(51) Int. Cl.
*B01J 49/06* (2017.01)
*B01J 49/53* (2017.01)
(Continued)

(52) U.S. Cl.
CPC ............ *D06F 39/007* (2013.01); *B01J 49/06* (2017.01); *B01J 49/53* (2017.01); *B01J 49/75* (2017.01);
(Continued)

(58) Field of Classification Search
None
See application file for complete search history.

(56) References Cited

U.S. PATENT DOCUMENTS

| | | | |
|---|---|---|---|
| 6,557,382 | B1 | 5/2003 | Koike et al. |
| 2015/0090648 | A1 | 4/2015 | Lim et al. |

FOREIGN PATENT DOCUMENTS

| | | | |
|---|---|---|---|
| JP | 2867906 | B2 | 3/1999 |
| JP | 11-300090 | A | 11/1999 |

(Continued)

OTHER PUBLICATIONS

International Search Report (PCT/ISA/210) issued by the International Searching Authority on Jul. 27, 2023 in corresponding International Application No. PCT/KR2023/005529.

(Continued)

*Primary Examiner* — Levon J Shahinian
(74) *Attorney, Agent, or Firm* — Sughrue Mion, PLLC

(57) ABSTRACT

A washing machine may include: a hardness component remover including a resin charging chamber between a downstream buffer space and an upstream buffer space and containing an ion-exchange resin; a saturated regeneration water generation vessel in which saturated regeneration water is to be generated; a regeneration water passage connecting the saturated regeneration water generation vessel to the downstream buffer space; a drain passage connecting the upstream buffer space to a drain; a first on-off valve to open and close the regeneration water passage; a second on-off valve to open and close the drain passage; at least one processor; and memory storing instructions that, when executed by the at least one processor, cause the at least one processor to perform a regeneration process to regenerate the ion-exchange resin.

16 Claims, 11 Drawing Sheets

(51) Int. Cl.

| | |
|---|---|
| ***B01J 49/75*** | (2017.01) |
| ***C02F 1/00*** | (2023.01) |
| ***C02F 1/42*** | (2023.01) |
| ***D06F 23/02*** | (2006.01) |
| ***D06F 33/32*** | (2020.01) |
| ***D06F 34/14*** | (2020.01) |
| ***D06F 39/00*** | (2024.01) |
| ***D06F 39/02*** | (2006.01) |
| ***D06F 39/08*** | (2006.01) |
| *C02F 101/10* | (2006.01) |
| *D06F 103/60* | (2020.01) |
| *D06F 105/02* | (2020.01) |

(52) U.S. Cl.

CPC ................ *C02F 1/008* (2013.01); *C02F 1/42* (2013.01); *D06F 23/02* (2013.01); *D06F 33/32* (2020.02); *D06F 34/14* (2020.02); *D06F 39/02* (2013.01); *D06F 39/028* (2013.01); *D06F 39/08* (2013.01); *C02F 2101/10* (2013.01); *C02F 2201/005* (2013.01); *C02F 2303/16* (2013.01); *C02F 2307/12* (2013.01); *D06F 2103/60* (2020.02); *D06F 2105/02* (2020.02)

(56) References Cited

FOREIGN PATENT DOCUMENTS

| | | | |
|---|---|---|---|
| JP | 2001-87592 | A | 4/2001 |
| JP | 2001-293285 | A | 10/2001 |
| JP | 2002-35608 | A | 2/2002 |
| JP | 2003-88764 | A | 3/2003 |
| JP | 2003-334549 | A | 11/2003 |
| JP | 2009-148664 | A | 7/2009 |
| JP | 5608607 | B2 | 10/2014 |
| KR | 10-0341937 | B1 | 8/2002 |
| KR | 10-0737926 | B1 | 7/2007 |
| KR | 10-2009-0004065 | A | 1/2009 |
| KR | 10-1280357 | B1 | 7/2013 |
| KR | 10-2015-0039546 | A | 4/2015 |
| KR | 10-2019-0137990 | A | 12/2019 |
| WO | 2013/160211 | A1 | 10/2013 |
| WO | 2017/162290 | A1 | 9/2017 |

OTHER PUBLICATIONS

Written Opinion (PCT/ISA/237) issued by the International Searching Authority on Jul. 27, 2023 in corresponding International Application No. PCT/KR2023/005529.

WATER SOFTENING DEVICE AND WASHING MACHINE

CROSS-REFERENCE TO RELATED APPLICATIONS

This application is a continuation application of International Application No. PCT/KR2023/005529 designating the United States, filed on Apr. 24, 2023, in the Korean Intellectual Property Receiving Office and claiming priority to Japanese Patent Application No. 2022-111713, filed on Jul. 12, 2022, in the Japan Patent Office, the disclosures of which are incorporated by reference herein in their entireties.

BACKGROUND

1. Field

The present disclosure relates to a washing machine having a water softening device.

2. Description of Related Art

Tap water in some regions contains many minerals such as Ca or Mg, and thus has a high degree of hardness. In such regions, using tap water for laundry reduces the effectiveness of detergents, resulting in a decrease in cleaning power. Thus, washing machines capable of softening tap water by using a water softening device have been proposed.

In a drum-type washing machine disclosed in Japanese Unexamined Patent No. 2001-87592, a detergent dispensing case and a water softening device are arranged one behind the other on a washing tub. The water softening device includes a salt case for accommodating salt, and an ion-exchange resin case for accommodating an ion-exchange resin. The salt case is arranged above the ion-exchange resin case. By supplying tap water to the salt case to prepare salt water, and then making the salt water flow into the ion-exchange resin case, the ion-exchange resin is regenerated. For regeneration of ion-exchange resins, it is known that salt water with a concentration of about 10% has the best regeneration efficiency. According to a water softening device disclosed in Japanese Unexamined Patent No. 2001-87592, by first supplying water to the salt case before regeneration to prepare highly saturated salt water, and supplying water to the salt case again immediately before regeneration to dilute the salt water, salt water with a concentration of about 10% is prepared.

SUMMARY

According to one or more example embodiments, a washing machine may include: a housing; a tub in the housing; a drum rotatable inside the tub; a detergent supply case to mix a detergent with water, and supply a resulting mixture to the tub; a hardness component remover in a treated water passage between a water supply source and the detergent supply case, and configured to soften hard water supplied from the water supply source and supply softened water to the detergent supply case. The hardness component remover may include: a downstream buffer space; an upstream buffer space; and a resin charging chamber between the downstream buffer space and the upstream buffer space and containing an ion-exchange resin. The washing machine may further include: a saturated regeneration water generation vessel in which saturated regeneration water with a regenerant dissolved therein at a saturation concentration is to be generated; a regeneration water passage connecting the saturated regeneration water generation vessel to the downstream buffer space; a drain passage connecting the upstream buffer space to a drain; a first on-off valve to open and close the regeneration water passage; a second on-off valve to open and close the drain passage; at least one processor; and memory storing instructions that, when executed by the at least one processor, cause the at least one processor to: perform a regeneration process to regenerate the ion-exchange resin by supplying the saturated regeneration water to the hardness component remover; and control the first on-off valve and the second on-off valve such that, in the regeneration process, the saturated regeneration water is mixed with water inside the downstream buffer space to generate conditioned regeneration water having a regeneration concentration less than the saturation concentration, and the conditioned regeneration water passes through the ion-exchange resin.

According to one or more example embodiments, a washing machine may include: a washing vessel; a detergent supply case to mix a detergent with water, and supply a resulting mixture to the washing vessel; a hardness component remover in a treated water passage between a water supply source and the detergent supply case, and configured to soften hard water supplied from the water supply source and supply softened water to the detergent supply case, the hardness component remover including a resin charging chamber containing an ion-exchange resin; a saturated regeneration water generation vessel in which saturated regeneration water with a regenerant dissolved therein at a saturation concentration is to be generated; at least one processor; and memory storing instructions that when executed by the at least one processor, cause the at least one processor to: control the washing machine to supply the softened water and the detergent to the washing vessel during a wash cycle; control the washing machine to supply the hard water supplied from the water supply source to the washing vessel during a rinse cycle; perform a regeneration process to regenerate the ion-exchange resin by supplying the saturated regeneration water to the hardness component remover; control the washing machine such that, in the regeneration process, the saturated regeneration water is mixed with water to generate conditioned regeneration water having a regeneration concentration less than the saturation concentration, and the conditioned regeneration water passes through the ion-exchange resin; and in the regeneration process performed for a first time after the regenerant is replenished in the saturated regeneration water generation vessel, perform water supply increase control such that an amount of water supplied to the saturated regeneration water generation vessel is larger than in the regeneration process performed for a second and subsequent times.

BRIEF DESCRIPTION OF THE DRAWINGS

Embodiments will be more clearly understood from the following detailed description taken in conjunction with the accompanying drawings in which.

DETAILED DESCRIPTION

Figure 1:
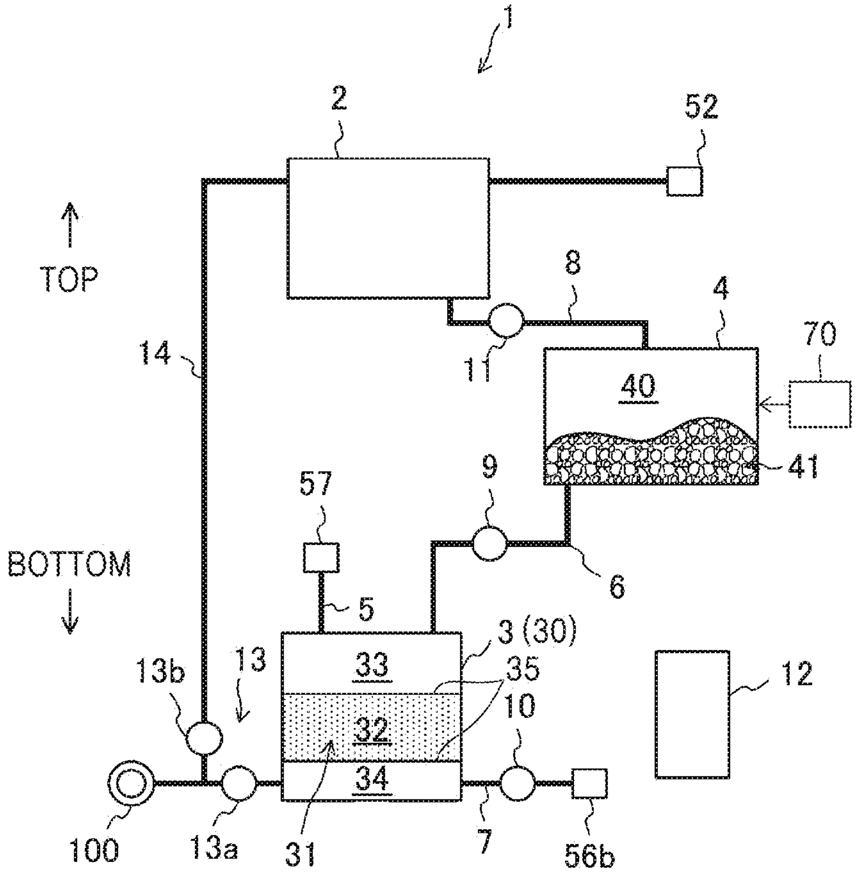
FIG. 1 is a schematic configuration diagram of a water softening device according to one or more embodiments of the present disclosure.

It should be appreciated that various embodiments of the present disclosure and the terms used therein are not intended to limit the technological features set forth herein to particular embodiments, and include various changes, equivalents, or alternatives for a corresponding embodiment.

With regard to the description of the drawings, similar reference numerals may be used to refer to similar or related elements.

A singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

As used herein, the term "and/or" includes any one or a combination of a plurality of related recited elements.

As used herein, such terms as "1st" and "2nd," or "first" and "second" may be used to simply distinguish a corresponding component from another, and does not limit the components in other aspect (e.g., importance or order).

When an element (e.g., a first element) is referred to, with or without the term "operatively" or "communicatively", as being "coupled with," "coupled to," "connected with," or "connected to" another element (e.g., a second element), it means that the element may be connected to the other element directly (e.g., in a wired manner), wirelessly, or via a third element.

As used herein, such terms as "comprises," "includes," or "has" specify the presence of stated features, numbers, stages, operations, components, parts, or a combination thereof, but do not preclude the presence or addition of one or more other features, numbers, stages, operations, components, parts, or a combination thereof.

When an element is referred to as being "connected to," "coupled to," "supported by," or "in contact with" another element, it means that the element is directly connected to, coupled to, supported by, or in contact with the other element, or that the element is indirectly connected to, coupled to, supported by, or in contact with the other element via a third element.

When an element is referred to as being "on" another element, it means that the element is in contact with the other element, or that still another element is present between the element and the other element.

A washing machine according to various embodiments may perform washing, rinse, spin-drying, and drying cycles. The washing machine is an example of a garment treatment device, and the garment treatment device is a concept that encompasses devices for washing a garment (i.e., an article to be washed or an article to be dried), devices for drying a garment, and devices capable of washing and drying a garment.

A washing machine according to various embodiments may include a top-loading washing machine in which an inlet for loading or unloading laundry is provided to face upward, or a front-loading washing machine in which an inlet for loading or unloading laundry is provided to face the front. A washing machine according to various embodiments may include a washing machine of a loading type other than top-loading washing machines and front loading washing machines.

A top-loading washing machine may wash laundry by using a water current generated by a rotating body such as a pulsator. A front-loading washing machine may wash laundry by rotating a drum to repeatedly raise and fall the laundry. A front-loading washing machine may include a drying-and-washing machine capable of drying laundry accommodated in a drum. The drying-and-washing machine may include a hot-air supply device for supplying high-temperature air into the drum and a condensation device for removing moisture from air discharged from the drum. For example, the drying-and-washing machine may include a heat pump device. A washing machine according to various embodiments may include a washing machine with a washing method other than the washing methods described above.

A washing machine according to various embodiments may include a housing for accommodating various components therein. The housing may be provided in the form of a box with a laundry inlet formed on one side.

The washing machine may include a door for opening and closing the laundry inlet. The door may be mounted on the housing to be rotatable by a hinge. At least a portion of the door may be transparent or translucent such that the inside of the housing is visible.

The washing machine may include a tub provided inside the housing to store water. The tub may be provided in a substantially cylindrical shape with a tub opening formed on one side, and may be arranged inside the housing such that the tub opening is arranged to correspond to the laundry inlet.

The tub may be connected to the housing by a damper. The damper may absorb vibration that occurs when the drum rotates, to attenuate the vibration transmitted to the housing.

The washing machine may include a drum provided to accommodate laundry.

The drum may be arranged inside the tub such that a drum opening provided on one side corresponds to the laundry inlet and the tub opening. Laundry may sequentially pass through the laundry inlet, the tub opening, and the drum opening to be accommodated in the drum, or may be unloaded from the drum.

The drum may rotate inside the tub to perform each operation according to washing, rinse, and/or spin-drying cycles. A plurality of holes may be formed on a cylindrical wall of the drum such that water stored in the tub may flow into or out of the drum.

The washing machine may include a driving device configured to rotate the drum. The driving device may include a driving motor and a rotating shaft for transmitting a driving force generated by the driving motor to the drum. The rotating shaft may penetrate the tub to be connected to the drum.

The driving device may rotate the drum forward or backward to perform each operation according to washing, rinse, and/or spin-drying cycles, or a drying cycle.

The washing machine may include a water supply device configured to supply water to the tub. The water supply device may include a water supply pipe and a water supply valve provided in the water supply pipe. The water supply pipe may be connected to an external water supply source. The water supply pipe may extend from the external water supply source to a detergent supply device and/or the tub. Water may be supplied to the tub through the detergent supply device. Water may be supplied to the tub without passing through the detergent supply device.

The water supply valve may open or close the water supply pipe in response to an electrical signal from a control unit. The water supply valve may allow or block supply of water to the tub from the external water supply source. The water supply valve may include, for example, a solenoid valve that is opened and closed in response to an electrical signal.

The washing machine may include a detergent supply device configured to supply a detergent to the tub. The detergent supply device may include a manual detergent supply device that requires a user to input a detergent to be used in each washing process, and an automatic detergent supply device that stores a large amount of detergent and automatically inputs a predetermined amount of detergent in a washing process. The detergent supply device may include a detergent compartment for storing a detergent. The detergent supply device may be configured to supply a detergent into the tub in a water supply process. Water supplied through the water supply pipe may be mixed with a detergent via the detergent supply device. The water mixed with the detergent may be supplied into the tub. The term 'detergent' encompasses pre-wash detergents, main wash detergents, fabric softeners, bleaching agents, and the like, and the detergent compartment may be divided into a pre-wash detergent storage area, a main wash detergent storage area, a fabric softener storage area, and a bleaching agent storage area.

The washing machine may include a drainage device configured to discharge water accommodated in the tub to the outside. The drainage device may include a drain or drain pipe extending from the bottom of the tub to the outside of the housing, a drain valve provided on the drain pipe to open and close the drain pipe, and a pump provided on the drain pipe. The pump may pump water from the drain pipe to the outside of the housing.

The washing machine may include a control panel arranged on one side of the housing. The control panel may provide a user interface for the user to interact with the washing machine. The user interface may include at least one input interface and at least one output interface.

The at least one input interface may convert sensory information received from the user into an electrical signal.

The at least one input interface may include a power button, an operation button, a course selection dial (or a course selection button), and washing/rinse/spin-drying setting buttons. The at least one input interface may include, for example, a tact switch, a push switch, a slide switch, a toggle switch, a microswitch, a touch switch, a touch pad, a touch screen, a jog dial, and/or a microphone.

The at least one output interface may visually or audibly provide information related to an operation of the washing machine to the user.

For example, the at least one output interface may provide, to the user, information related to a wash cycle, an operating time of the washing machine, wash settings/rinse settings/spin-drying settings. Information about an operation of the washing machine may be output through a screen, an indicator, a voice, or the like. The at least one output interface may include, for example, a liquid-crystal display (LCD) panel, a light-emitting diode (LED) panel, a speaker, and the like.

The washing machine may include a communication module for communicating with an external device in a wired and/or wireless manner.

The communication module may include at least one of a short-range wireless communication module or a long-range communication module.

The communication module may transmit or receive data to or from an external device (e.g., a server, a user device, and/or a home appliance). For example, the communication module may establish a communication with a server, a user device, and/or a home appliance, and transmit and receive various types of data.

To this end, the communication module may support establishment of a direct (e.g., wired) communication channel or a wireless communication channel between external devices, and communication through the established communication channel. According to one or more embodiments, the communication module may include a wireless communication module (e.g., a cellular communication module, a short-range wireless communication module, or a global navigation satellite system (GNSS) communication module) or a wired communication module (e.g., a local area network (LAN) communication module or a power line communication module). The corresponding communication module may communicate with an external device through a first network (e.g., a short-range communication network such as Bluetooth, Wi-Fi Direct, or Infrared Data Association (IrDA)) or a second network (e.g., a long-range communication network such as a legacy cellular network, a 5G network, a next-generation communication network, the Internet, or a computer network (e.g., a LAN or a wide area network (WAN)). These types of communication modules may be integrated into one component (e.g., a single chip) or implemented by a plurality of separate components (e.g., a plurality of chips).

The short-range wireless communication module may include, but is not limited to, a Bluetooth communication module, a Bluetooth Low Energy (BLE) communication module, a network interface controller (NIC) module, a wireless local area network (WLAN) (Wi-Fi) communication module, a Zigbee communication module, an IrDA communication module, a Wi-Fi Direct (WFD) communication module, an ultra-wideband (UWB) communication module, an Ant+ communication module, a microwave (uWave) communication module, and the like.

The long-range communication module may include a communication module for performing various types of long-range communication, and may include a mobile communication unit. The mobile communication unit transmits and receives radio signals to and from at least one of a base station, an external terminal, or a server, on a mobile communication network.

In one or more embodiments, the communication module may communicate with an external device such as a server, a user device, and other home appliances, through a nearby access point (AP). The AP may connect a LAN to which the washing machine or a user device is connected, to a wide area network (WAN) to which a server is connected. The washing machine or user device may be connected to the server via the WAN. The control unit may control various components of the washing machine (e.g., the driving motor or the water supply valve). The control unit may control various components of the washing machine to perform at least one of a water supply cycle, a washing cycle, a rinse cycle, and/or a spin-drying cycle, according to a user input. For example, the control unit may control the driving motor to adjust the rotational speed of the drum, or control the water supply valve of the water supply device to supply water to the tub.

The control unit may include hardware such as a central processing unit (CPU) or a memory, and software such as a control program. For example, the control unit may include at least one memory storing an algorithm for controlling operations of components in the washing machine, and data in the form of a program, and at least one processor configured to perform the above-described operations by using the data stored in the at least one memory. Each of the memory and the processor may be implemented as a separate chip. The processor may include one or more processor chips, or may include one or more processing cores. The memory may include one or more memory chips, or may include one or more memory blocks. In addition, the memory and the processor may be implemented as a single chip.

For regeneration of ion-exchange resins, it is known that salt water with a concentration of about 10% has excellent regeneration efficiency. For example, regeneration water may be generated by supplying water to a salt case to prepare highly saturated salt water, and supplying water again to the highly concentrated salt water to dilute it to a concentration of about 10%. When the water level inside the salt case reaches a certain level, regeneration water automatically flows from the salt case to an ion-exchange resin case by an action of a siphon.

According to the configuration for adjusting the salt concentration of regeneration water through a dilution process as described above, because salt is eluted even during the concentration adjustment, it is necessary to adjust the salt concentration of the regeneration water to about 10% considering the amount of salt eluted. However, the regeneration water inside the salt case flows out from the salt case when the water level reaches a certain level, and thus, when the amount of salt accommodated in the salt case is large, the amount of diluted water decreases, whereas, when the amount of salt is small, the amount of diluted water increases. Thus, there is a concern that the salt concentration of the regeneration water flowing out from the salt case may be uneven depending on the amount of salt inside the salt case.

The present disclosure provides a water softening device having a relatively simple structure and capable of stably generating regeneration water with an optimal concentration for regeneration of an ion-exchange resin, and a washing machine using the water softening device.

FIG. 1 is a schematic configuration diagram of a water softening device 1 according to one or more embodiments of the present disclosure. The embodiment of the water softening device 1 illustrated in FIG. 1 may be applied to a washing machine, a dishwasher, and the like. FIG. 1 illustrates an example in which the water softening device 1 is applied to a washing machine 50. Referring to FIG. 1, the water softening device 1 may include a hardness component remover 3, a saturated regeneration water generation vessel 4, a treated water passage 5, a regeneration water passage 6, a drain passage 7, a first on-off valve 9, a second on-off valve 10, a control device 12, and the like. The water softening device 1 may further include a pool tank 2, a regeneration water supply passage 8, and a third on-off valve 11.

The saturated regeneration water generation vessel 4 may be arranged above the hardness component remover 3. The pool tank 2 may be arranged above the saturated regeneration water generation vessel 4. According to the water softening device 1 with the above configuration, water may be supplied by using the water pressure of tap water and the gravity without using a pump or the like. Thus, the operating cost and part costs of the water softening device 1 may be reduced, and the structure of the water softening device 1 may be simplified. However, the water softening device 1 may include a pump, or the like as necessary.

A water supply source of the water softening device 1 may be a general water tap 100. By opening the water tap 100, pressurized tap water may be supplied to the water softening device 1. Here, the tap water may be hard water. The water softening device 1 softens the tap water supplied from the water tap 100, and supplies the softened tap water to a certain water intake point (a detergent supply case 57 in the present embodiment).

Water supply valves 13 (a first water supply valve 13*a* and a second water supply valve 13*b*) may be disposed between the water tap 100 and the water softening device 1. By opening the water supply valves 13, tap water is supplied to the water softening device 1.

The pool tank 2 is connected to a water supply source, for example, the water tap 100. The pool tank 2 is a container for storing water and is arranged in an untreated water passage 14. The untreated water passage 14 is a passage for supplying tap water to a tub 52 (washing vessel) as washing water. Thus, tap water is stored in the pool tank 2. The pool tank 2 is open to the atmosphere.

The hardness component remover 3 is arranged in the treated water passage 5 between the water supply source (the water tap 100) and the detergent supply case 57 to soften hard water supplied from the water supply source and supply it to the detergent supply case 57. The hardness component remover 3 includes a downstream buffer space 33, an upstream buffer space 34, and a resin charging chamber 32 that is arranged between the downstream buffer space 33 and the upstream buffer space 34 and is charged with an ion-exchange resin 31 having a water softening function. The drain passage 7 and the regeneration water passage 6 are connected to the hardness component remover 3.

The hardness component remover 3 includes a case 30. The interior of the case 30 includes the resin charging chamber 32 filled with the ion-exchange resin 31, the downstream buffer space 33 above the resin charging chamber 32, and the upstream buffer space 34 below the resin charging chamber 32. In the washing machine 50 (see FIG. 4), the charge amount of the ion-exchange resin 31 may be, for example, about 130 ml.

The downstream buffer space 33 is connected to the downstream side of the treated water passage 5. The downstream buffer space 33 and the saturated regeneration water generation vessel 4 are connected to each other by the regeneration water passage 6. The first on-off valve 9 is disposed in the regeneration water passage 6. The first on-off valve 9 opens and closes the regeneration water passage 6. The downstream buffer space 33 is open to the atmosphere through the downstream side of the treated water passage 5 and the regeneration water passage 6.

The upstream buffer space 34 is connected to the upstream side of the treated water passage 5. The drain passage 7 connects the upstream buffer space 34 to a drain or drain pipe 56*b*. The second on-off valve 10 is disposed in the drain passage 7. The second on-off valve 10 opens and closes the drain passage 7. By opening the second on-off valve 10, water may be discharged from the hardness component remover 3 through the drain pipe 56*b*.

In the saturated regeneration water generation vessel 4, saturated regeneration water is generated in which a regenerant is dissolved at a saturation concentration. The saturated regeneration water generation vessel 4 includes a regenerant accommodation chamber 40 for accommodating a regenerant 41. The regenerant 41 contains salt (sodium chloride). The main component of the regenerant 41 is salt (sodium chloride). Granular salt with a size of several millimeters is commercially available as a regenerant.

The saturated regeneration water generation vessel 4 is connected to the hardness component remover 3 by the regeneration water passage 6. The saturated regeneration water generation vessel 4 is connected to the pool tank 2 by the regeneration water supply passage 8. The third on-off valve 11 is disposed in the regeneration water supply passage 8. The third on-off valve 11 opens and closes the regeneration water supply passage 8. By opening the third on-off valve 11, tap water may be supplied from the pool tank 2 to the regenerant accommodation chamber 40.

During execution of a washing process, the third on-off valve 11 is opened to supply tap water to the regenerant accommodation chamber 40 in which the regenerant 41 is accommodated. After a preset time period (e.g., 3 minutes), regeneration water (saturated regeneration water) in which salt is dissolved at a saturation concentration (about 25%) is generated in the saturated regeneration water generation vessel 4.

The interior of the regenerant accommodation chamber 40 is open to the atmosphere. By opening the first on-off valve 9, saturated regeneration water may be injected from the saturated regeneration water generation vessel 4 into the hardness component remover 3 (the downstream buffer space 33).

The control device 12 may control the water softening device 1. The control device 12 applied to the washing machine 50 to be described below may control various components of the washing machine 50 including the water softening device 1. The control device 12 may control various components of the washing machine to perform at least one of a water supply cycle, a washing cycle, a rinse cycle, and/or a spin-drying cycle, according to a user input. The control device 12 may include hardware such as a CPU or a memory, and software such as a control program. For example, the control device 12 may include at least one memory storing an algorithm for controlling operations of components in the washing machine 50, and data in the form of a program, and at least one processor configured to perform the above-described operations by using the data stored in the at least one memory. Each of the memory and the processor may be implemented as a separate chip. The processor may include one or more processor chips, or may include one or more processing cores. The memory may include one or more memory chips, or may include one or more memory blocks. In addition, the memory and the processor may be implemented as a single chip.

The control device 12 performs a regeneration process of regenerating the ion-exchange resin 31 by supplying saturated regeneration water to the hardness component remover 3. During the regeneration process, the control device 12 may control the first on-off valve 9 and the second on-off valve 10 such that saturated regeneration water is mixed with water inside the downstream buffer space 33 to generate conditioned regeneration water having a regeneration concentration that is less than the saturation concentration, and the conditioned regeneration water passes through the ion-exchange resin 31. The control device 12 may control the third on-off valve 11 to generate saturated regeneration water.

When executing the regeneration process, the control device 12 first initiates drainage from the hardness component remover 3 by opening the second on-off valve 10. Thereafter, the control device 12 opens the first on-off valve 9 in a state in which a preset amount of residual water (the residual water may be soft water or, in some cases, hard water) remains in the downstream buffer space 33. Then, a certain amount of saturated regeneration water is injected from the saturated regeneration water generation vessel 4 into the downstream buffer space 33. In the downstream buffer space 33, the saturated regeneration water and the residual water are mixed with each other to generate mixed water (conditioned regeneration water), and the conditioned regeneration water passes through the resin charging chamber 32.

The water softening device 1 is configured such that the salt concentration (regeneration concentration) of the conditioned regeneration water is adjusted to a salt concentration with the best regeneration efficiency, for example, 10%. Here, the salt concentration of 10% is a desired concentration. The salt concentration of actually generated conditioned regeneration water is about 10%.

The downstream buffer space 33 is formed to have a size (inner volume) suitable for generating conditioned regeneration water containing salt in an amount greater than that required for regeneration of the ion-exchange resin 31. That is, in order to regenerate the ion-exchange resin 31 without excess or deficiency, 80 g to 150 g of salt is required for 1 L of the ion-exchange resin 31 for one regeneration process. A preset amount of ion-exchange resin 31 is charged in the resin charging chamber 32. Because the downstream buffer space 33 has a size (inner volume) suitable for generating conditioned regeneration water containing salt in an amount greater than or equal to the amount of the ion-exchange resin 21 charged in the resin charging chamber 32, the ion-exchange resin 31 may be regenerated without excess or deficiency.

The hardness component remover 3 is designed such that the rate of drainage from the hardness component remover 3 is less than the rate of injection of saturated regeneration water into the hardness component remover 3. This design may be implemented, for example, by a mesh 35. By appropriately selecting the mesh size of the mesh 35, the rate of drainage may be made less than the rate of injection.

By doing so, the residual water and the saturated regeneration water injected from the saturated regeneration water generation vessel 4 may be sufficiently mixed with each other inside the downstream buffer space 33. Accordingly, the conditioned regeneration water generated in the downstream buffer space 33 may have a relatively uniform salt concentration of about 10%, and the conditioned regeneration water may pass through the resin charging chamber 32.

As the tap water is softened, the ion-exchange resin 31 inside the resin charging chamber 32 loses its water softening ability as it goes from upstream to downstream. In order to maximize the use of the water softening ability of the ion-exchange resin 31, a water flow in the resin charging chamber 32 may be laminar, and thus, the interior of the resin charging chamber 32 may have the shape of a column. In addition, for the same reason, a connection surface between the resin charging chamber 32 and the upstream buffer space 34, and/or a connection surface between the resin charging chamber 32 and the downstream buffer space 33 may be identical to the cross-sectional shape (the cross-section perpendicular to the water flow direction) of the resin charging chamber 32.

By providing the connection surfaces, the conditioned regeneration water flowing from the downstream buffer space 33 to the resin charging chamber 32 becomes a laminar flow, and thus, the ion-exchange resin 31 may be regenerated efficiently. In addition, because a time period for which the residual water and the saturated regeneration water are mixed with each other in the downstream buffer space 33 is short, the configuration for generating conditioned regeneration water in the downstream buffer space 33 may enable efficient regeneration with a simple configuration.

The saturated regeneration water has a high concentration, and thus, the amount of saturated regeneration water in one regeneration process is small (e.g., about 60 ml). Thus, injection of saturated regeneration water into the downstream buffer space 33 may be performed in a short time period (e.g., about 2 to 3 seconds) even through a gravity flow.

In addition, drainage from the hardness component remover 3 is performed through a gravity flow. However, the rate of drainage is decreased by the resistance of the ion-exchange resin 31 or the mesh 35 that divides the resin charging chamber 32 and the upstream buffer space 34. The rate of drainage from the hardness component remover 3 is significantly less than the rate of injection of saturated regeneration water into the hardness component remover 3. While the level of residual water in the downstream buffer space 33 slightly decreases, the entire amount of saturated regeneration water may be injected into the hardness component remover 3, that is, the downstream buffer space 33. By adjusting the rate of injection and rate of drainage, an appropriate balance may be achieved between supply of saturated regeneration water to the hardness component remover 3 and drainage from the hardness component remover 3.

The flow path cross-sectional area of the drain passage 7 may be greater than the flow path cross-sectional area of the regeneration water passage 6. The ion-exchange resin 31 generally has a shape of a small sphere with a diameter of slightly less than 1 mm. Thus, the upper and lower boundaries of the resin charging chamber 32 are formed with the tightly woven mesh 35 to prevent the ion-exchange resin 31 from leaking out. When the mesh 35 is tightly woven, the surface tension becomes stronger, which affects drainage. Thus, in order to improve drainage, the flow path cross-sectional area of the drain passage 7 may be made greater than the flow path cross-sectional area of the regeneration water passage 6. This is because the rate of drainage depends on an interface between the resin charging chamber 32 and the upstream buffer space 34, that is, the mesh 35, rather than the flow path cross-sectional area of the drain passage 7.

When regeneration water is passed through the resin charging chamber 32, regeneration water containing Ca ions or Mg ions remains in the resin charging chamber 32 and the upstream buffer space 34 through ion exchange between the regeneration water and the ion-exchange resin 31. When the regeneration water comes into contact with the ion-exchange resin 31 again, the water softening ability of the ion-exchange resin 31 that has been regenerated may be reduced.

By making the flow path cross-sectional area of the drain passage 7 greater than the flow path cross-sectional area of the regeneration water passage 6, regeneration water containing Ca ions or Mg ions may be quickly discharged from the resin charging chamber 32 and the upstream buffer space 34 without blockage, and thus, the ion-exchange resin 31 may be efficiently regenerated. In addition, as described below, regeneration water containing Ca ions or Mg ions attached to an inner wall of the upstream buffer space 34 may also be discharged by a water flow supplied to the upstream buffer space 34 through the water tap 100, and thus, the ion-exchange resin 31 may be regenerated more efficiently.

The first on-off valve 9 is opened at a timing when the amount of water discharged from the hardness component remover 3 becomes equal to the amount of saturated regeneration water to be injected into the downstream buffer space 33. At the start of the regeneration process, the downstream buffer space 33 is filled with soft water. At a time point when the amount of water discharged from the hardness component remover 3 becomes equal to the amount of saturated regeneration water to be injected into the downstream buffer space 33 (injection amount), a space corresponding to the injection amount of saturated regeneration water is formed in an upper region of the downstream buffer space 33, and thus, the saturated regeneration water may be injected into the downstream buffer space 33 seamlessly as much as the injection amount.

As described above, the rate of injection of saturated regeneration water into the hardness component remover 3 is significantly greater than the rate of drainage from the hardness component remover 3. Thus, when the first on-off valve 9 is opened at the above timing, the entire amount of saturated regeneration water may be immediately injected into the downstream buffer space 33. In addition, as the saturated regeneration water and the residual water are mixed with each other, conditioned regeneration water may be generated inside the downstream buffer space 33 with ease. That is, the downstream buffer space 33 may be formed to have a bare minimum size.

In general, because the ion-exchange resin 31 swells, spaces are provided above and below the resin charging chamber 32, considering swelling. By forming the downstream buffer space 33 to have a bare minimum size, an existing space, that is, a space considering swelling, may be used as the downstream buffer space 33. Thus, it is possible to implement the water softening device 1 at low cost.

Figure 2:
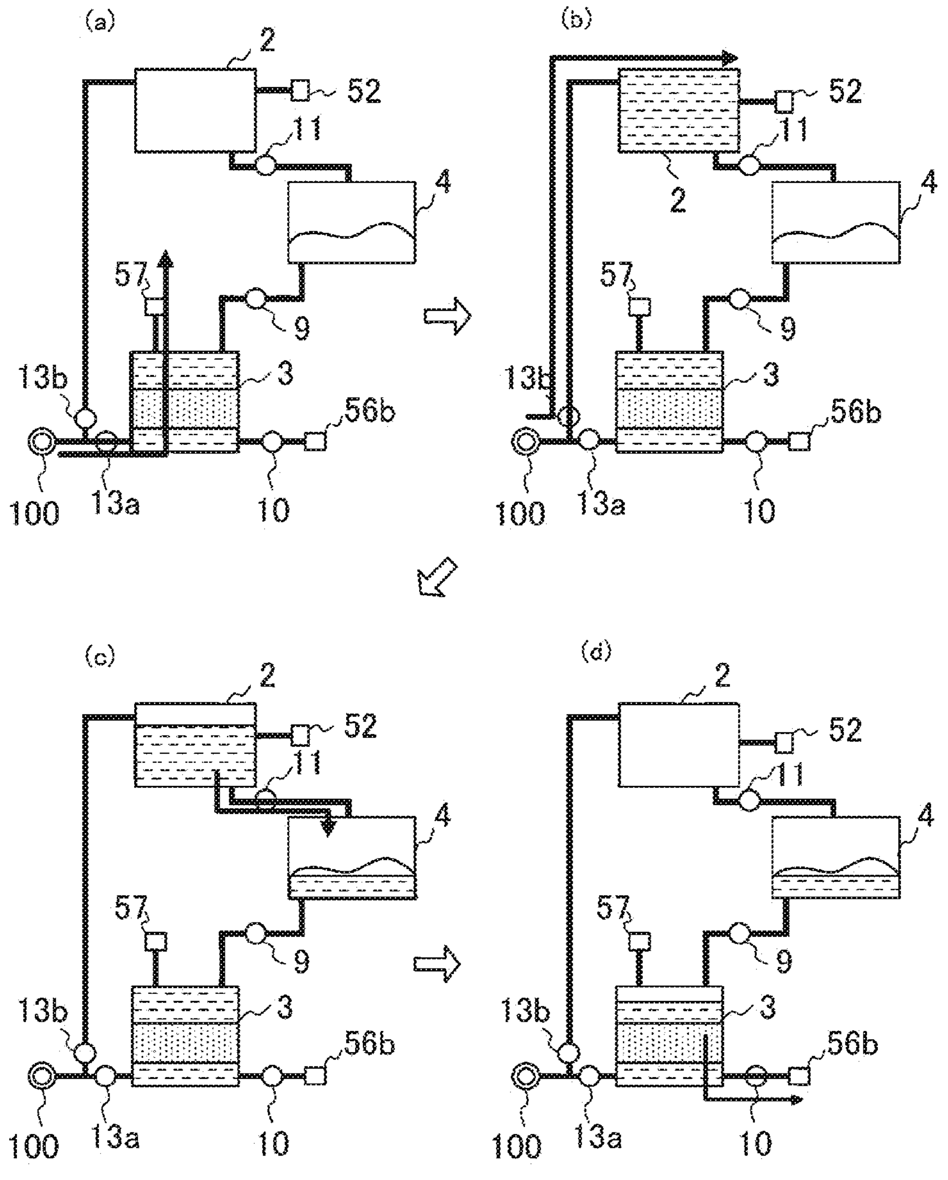
FIG. 2 is a diagram for describing an operation of a water softening device according to one or more embodiments of the present disclosure.
Figure 3:
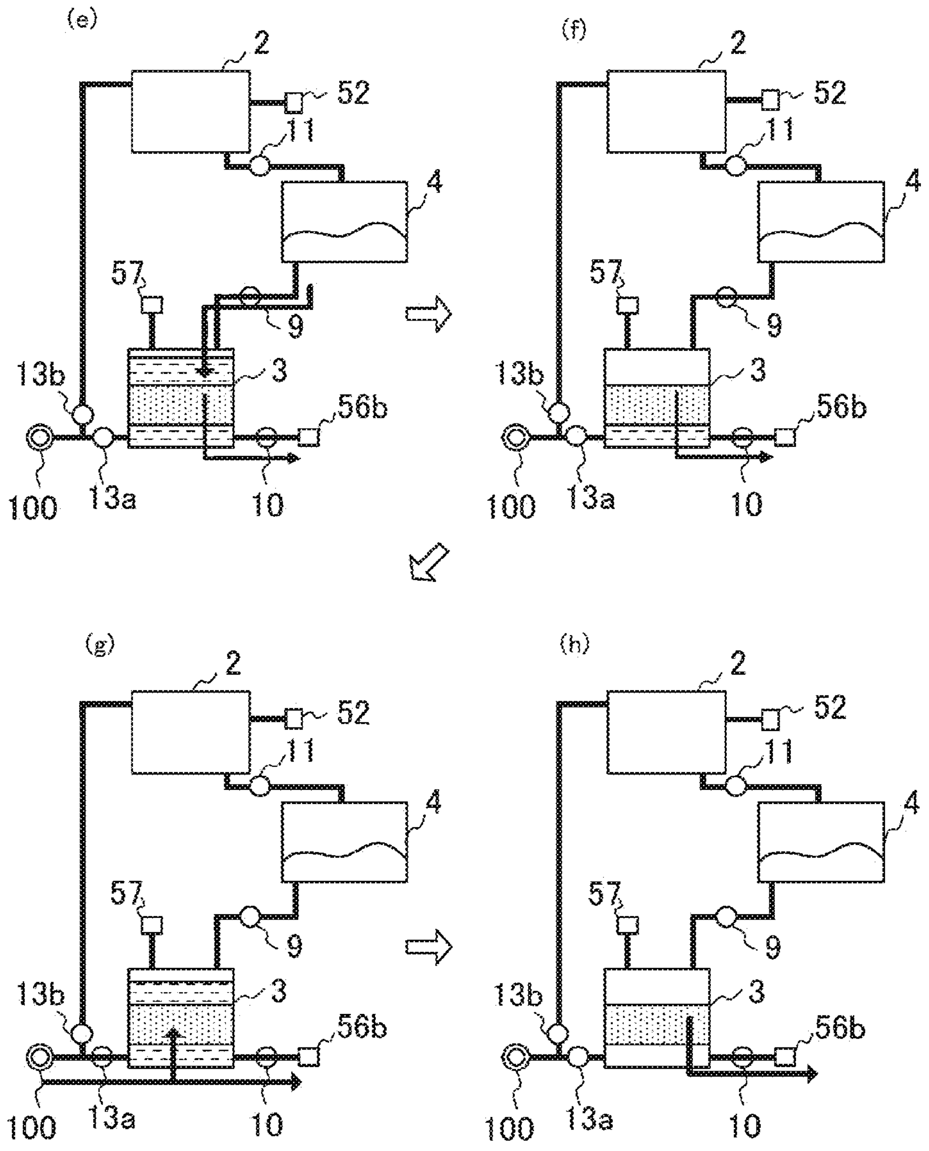
FIG. 3 is a diagram for describing an operation of a water softening device according to one or more embodiments of the present disclosure.

FIGS. 2 and 3 are drawings for describing operations of the water softening device 1, according to one or more embodiments of the present disclosure. (a) of FIG. 2 shows a state of a water softening process, which is an original function of the water softening device 1. (b) to (d) of FIG. 2 and (e) to (h) of FIG. 3 show regeneration processes.

Referring to (a) of FIG. 2, the first on-off valve 9, the second on-off valve 10, and the third on-off valve 11 are closed. A regenerant (salt) is accommodated in the regenerant accommodation chamber 40. When performing a water softening process, the first water supply valve 13*a* is opened. Then, tap water flows from the water tap 100 into the hardness component remover 3 by the pressure of the tap water.

As the tap water passes through the resin charging chamber 32, hardness components of the tap water are removed by the ion-exchange resin 31 and thus softened. Thus, the tap water flowing downstream of the treated water passage 5 after the downstream buffer space 33 is soft water. When the amount of water passing through the hardness component remover 3 reaches a preset amount or greater, the adsorption performance of the ion-exchange resin 31 deteriorates, making it impossible to properly soften tap water. In this case, the control device 12 performs a process of regenerating the ion-exchange resin 31. The ion-exchange resin 31 may be reused repeatedly by restoring its adsorption performance through the regeneration process.

In the regeneration process, the control device 12 opens the second water supply valve 13*b* to supply tap water to the pool tank 2, as illustrated in (b) of FIG. 2. At this time, the first water supply valve 13*a* is closed. The hardness component remover 3 is filled with tap water (hard water and soft water).

As illustrated in (c) of FIG. 2, the third on-off valve 11 is opened for a certain time period to supply a certain amount of tap water to the regenerant accommodation chamber 40. The amount of water supplied to the regenerant accommodation chamber 40 is an amount required to generate saturated regeneration water required for the regeneration process, and is preset according to the charging amount of the ion-exchange resin 31. For example, the amount of water stored in the pool tank 2, and the amount of water supplied from the pool tank 2 may be set to be equal to each other. Thus, a time period for which the third on-off valve 11 is opened may be set such that water collected in the pool tank 2 is sufficiently discharged.

For example, after a few minutes, saturated regeneration water (salt water with a saturation concentration) is generated in the regenerant accommodation chamber 40. Thereafter, the concentration of the saturated regeneration water is maintained. An operation of generating regeneration water needs to be completed before the regeneration process, and thus may be performed during execution of a washing process. By this, the regeneration process may be performed efficiently.

Next, the control device 12 initiates a specific regeneration process. Once the specific regeneration process is initiated, no washing water may be supplied until the process is completed, the process may be performed separately from the washing process. As illustrated in (d) of FIG. 2, the control device 12 opens the second on-off valve 10 to initiate drainage from the hardness component remover 3.

As described above, the rate of drainage is low, but water is quickly discharged from the hardness component remover 3 through the drain pipe 56*b* via the drain passage 7 without blockage. Accordingly, a space is formed in an upper portion of the downstream buffer space 33 and gradually becomes larger. In addition, at a timing when the amount of discharged water reaches the injection amount of saturated regeneration water, the control device 12 opens the first on-off valve 9.

As illustrated in (e) of FIG. 3, the saturated regeneration water is injected into the downstream buffer space 33. As described above, the entire amount of saturated regeneration water may be injected into the downstream buffer space 33 in a short time period. In the downstream buffer space 33, saturated regeneration water is rapidly injected to be effectively mixed with the remaining soft water, and thus, the concentration of the mixed water (conditioned regeneration water) may be uniform.

Even during drainage, conditioned regeneration water with a salt concentration of about 10% is generated in the downstream buffer space 33. Thereafter, as illustrated in (f) of FIG. 3, the generated conditioned regeneration water slowly flows into the resin charging chamber 32, and the ion-exchange resin 31 is regenerated.

After a certain time period has elapsed, the drainage of the conditioned regeneration water is completed, and the interior of the hardness component remover 3 is empty. The interior of the regenerant accommodation chamber 40 is also empty. The control device 12 may then perform a cleaning process of cleaning the ion-exchange resin 31.

As illustrated in (g) of FIG. 3, the first on-off valve 9 is closed (the second on-off valve 10 is kept opened), and the first water supply valve 13*a* is opened for a certain time period to supply tap water to the hardness component remover 3 until the downstream buffer space 33 is filled with tap water. That is, by simultaneously performing drainage from and water supply to the hardness component remover 3, the interior of the hardness component remover 3 and the ion-exchange resin 31 are washed and purified.

When the drainage is completed, the control device 12 closes the second on-off valve 10. The regeneration process is terminated. Thereafter, as illustrated in (a) of FIG. 2, by opening the first water supply valve 13*a*, appropriately softened tap water may be supplied to the tub 52 as needed.

Figure 4:
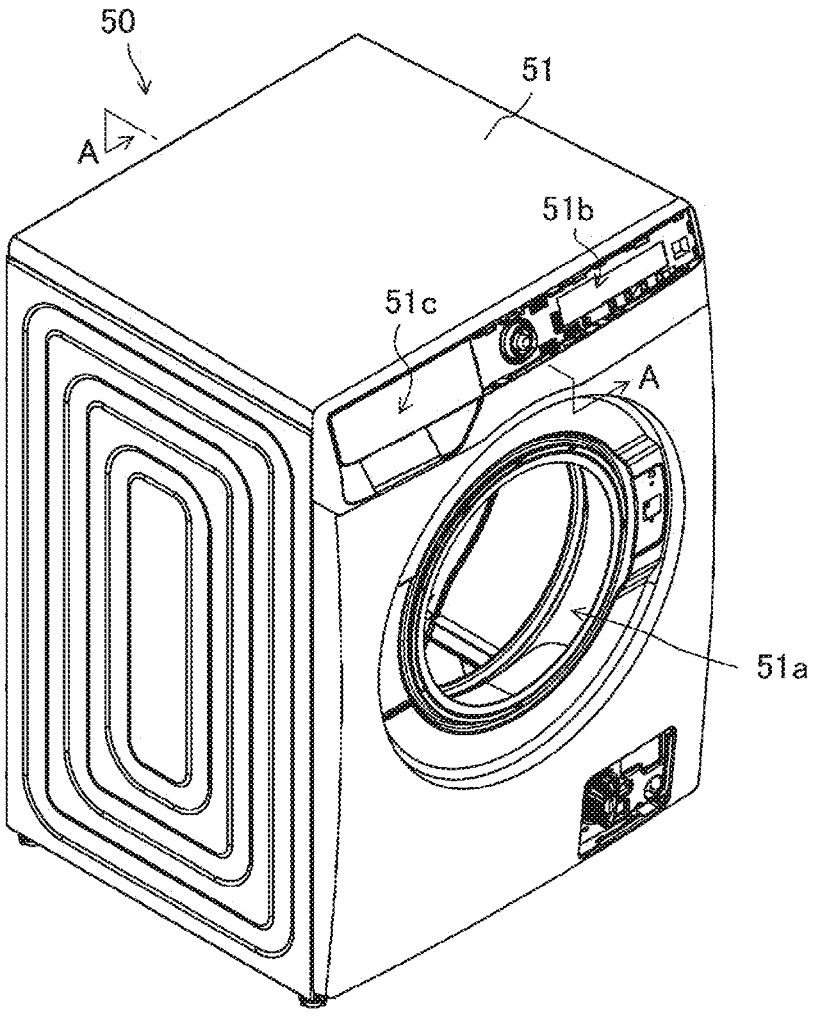
FIG. 4 is a schematic external view of a washing machine to which a water softening device is applied, according to one or more embodiments of the present disclosure.
Figure 5:
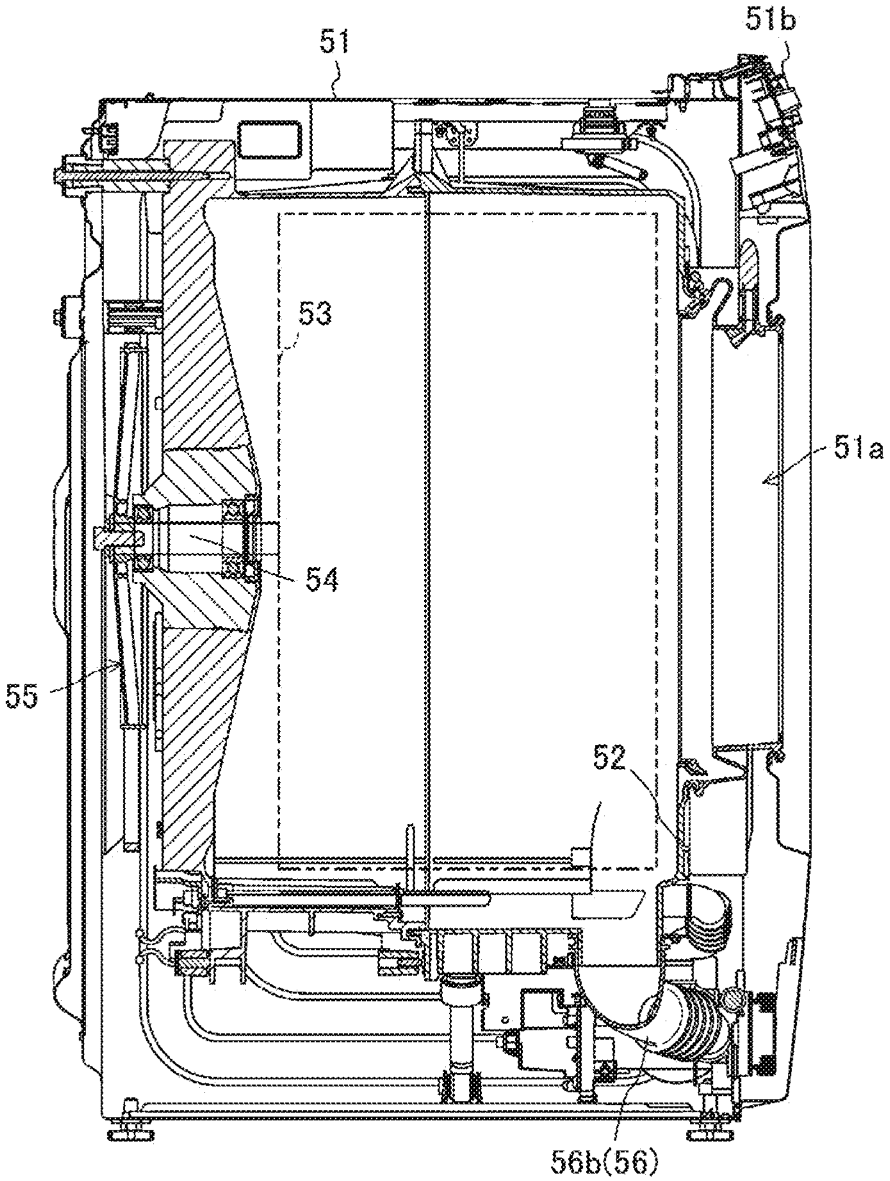
FIG. 5 is a schematic cross-sectional view taken along line A-A of FIG. 4.
Figure 6:
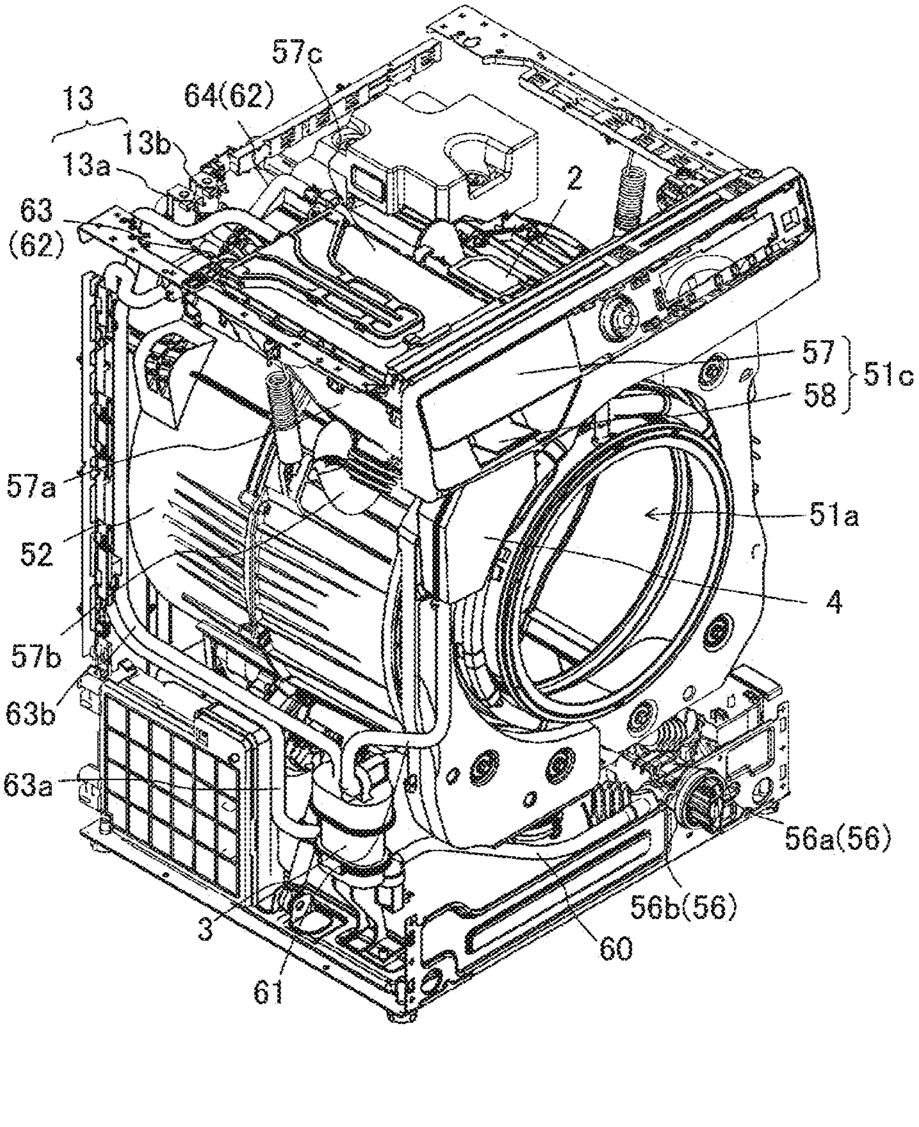
FIG. 6 is a schematic diagram of an internal structure of a washing machine according to one or more embodiments of the present disclosure.
Figure 7:
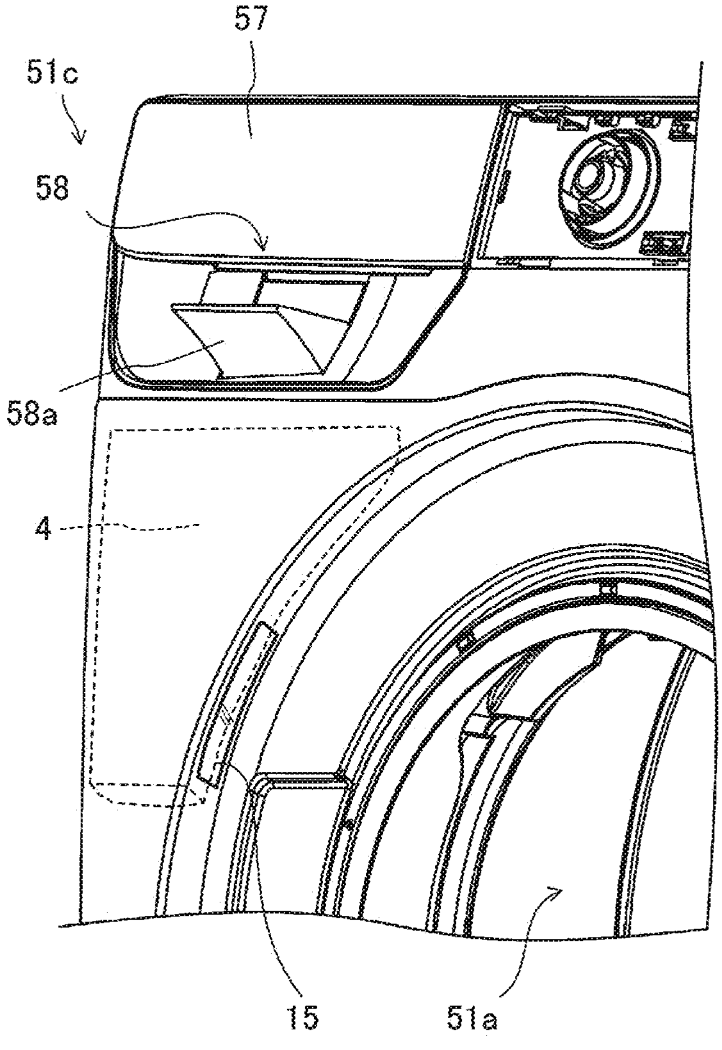
FIG. 7 is a partial perspective view of a washing machine according to one or more embodiments of the present disclosure.

Hereinafter, a detailed example of application of the water softening device 1 of the present disclosure will be described. FIG. 4 is a schematic external view of the washing machine 50 to which the water softening device 1 is applied, according to one or more embodiments of the present disclosure. FIG. 5 is a schematic cross-sectional view taken along line A-A of FIG. 4. FIG. 6 is a schematic diagram of an internal structure of the washing machine 50 according to one or more embodiments of the present disclosure. FIG. 7 is a partial perspective view of the washing machine 50 according to one or more embodiments of the present disclosure.

As illustrated in FIG. 4, the washing machine 50 has a box-shaped housing 51. The water softening device 1 may be disposed inside the housing 51. The configuration of the water softening device 1 is approximately the same as described above with reference to FIGS. 1 to 3. For the same components, the same names and reference numerals are used, and thus, descriptions thereof are omitted or simplified. The washing machine 50 of the present embodiment is a front-loading washing machine, which is also referred to as a drum-type washing machine, in which a laundry inlet 51*a* is provided on a front surface of the housing 51. A door (not shown) for opening and closing the laundry inlet 51*a* may be provided on the front surface of the housing 51. A manipulation panel 51*b* through which a user performs a manipulation, and a detergent injection unit 51*c* for injecting a detergent and a regenerant are disposed in an upper front portion of the housing 51.

As illustrated in FIG. 5, the tub 52 having a cylindrical shape with a bottom and capable of storing water is accommodated in the housing 51. The tub 52 is laid on its side such that its opening faces the laundry inlet 51*a*. A rotatable cylindrical drum 53 (schematically illustrated with an imaginary line) with a bottom is accommodated in the tub 52. The interior of the drum 53 is connected to the laundry inlet 51*a*, and the drum 53 is arranged coaxially with the tub 52. Laundry may be loaded into the drum 53 through the laundry inlet 51*a*.

The drum 53 is connected by a shaft 54 to a driving mechanism 55 disposed in a rear portion of the housing 51. The drum 53 is rotated by driving of the driving mechanism 55. A drain mechanism 56 that drains water by using a drain pump 56*a* is disposed in a lower right portion of the housing 51. The drain mechanism 56 discharges water collected in the tub 52 through the drain pipe 56*b* connected to a lower front portion of the tub 52.

As illustrated in FIG. 6, the detergent injection unit 51*c* may include the detergent supply case 57 for accommodating a detergent, mixing a detergent with water, and supplying the mixture to the tub 52, and a regenerant inlet 58. The detergent supply case 57 may include a tray-type detergent storage container (not shown) for storing a detergent, a slide case 57*a* for accommodating the detergent storage container to be withdrawable, and a cleaning water pipe 57*b* for flowing water inside the slide case 57*a* to the tub 52.

A water supply plate 57*c* for supplying water to the detergent storage container is disposed on the slide case 57*a*. When water is supplied to the water supply plate 57*c*, the water is supplied to the detergent storage container. A detergent and water are mixed with each other inside the detergent storage container. The mixed water is supplied to the tub 52 through the cleaning water pipe 57*b*.

As illustrated in FIG. 7, the regenerant inlet 58 is disposed in a front portion of the detergent supply case 57. A sway-type injection guide 58*a* that serves as a lid is disposed in the regenerant inlet 58. The regenerant inlet 58 is opened by pulling an upper portion of the injection guide 58*a*.

Referring back to FIG. 6, in the saturated regeneration water generation vessel 4, saturated regeneration water is generated in which a regenerant is dissolved at a saturation concentration. The saturated regeneration water generation vessel 4 is arranged below the detergent injection unit 51*c*. In detail, the saturated regeneration water generation vessel 4 is arranged along an edge of the laundry inlet 51*a*, at a front left corner of the housing 51. The saturated regeneration water generation vessel 4 has an approximately triangular shape corresponding to the shape of an area where it is arranged. The regenerant accommodation chamber 40 (see FIG. 1) having a shape that gradually narrows toward the bottom is disposed inside the saturated regeneration water generation vessel 4.

In a state in which the detergent storage container is accommodated in the slide case 57*a*, an upper portion of the saturated regeneration water generation vessel 4 and the regenerant inlet 58 are in communication with each other. Accordingly, when a regenerant is injected into the regenerant inlet 58, the regenerant is collected at the bottom of the regenerant accommodation chamber 40.

As illustrated in FIG. 7, a window 15 may be disposed on an edge of the laundry inlet 51*a* adjacent to the saturated regeneration water generation vessel 4. The interior of the saturated regeneration water generation vessel 4 is visible through the window 15. The remaining amount of the regenerant inside the regenerant accommodation chamber 40 may be determined through the window 15.

When viewed from the front of the housing 51, the pool tank 2 is arranged on the right side of the detergent supply case 57. In the present embodiment, the pool tank 2 is arranged at a position that is at the front in the front-rear direction and at the center in the left-right direction in an upper area of the housing 51.

The hardness component remover 3 is arranged in the treated water passage 5 between the water supply source and the detergent supply case 57 to soften hard water supplied from the water supply source and supply it to the detergent supply case 57. The hardness component remover 3 may include the downstream buffer space 33, the upstream buffer space 34, and the resin charging chamber 32 that is arranged between the downstream buffer space 33 and the upstream buffer space 34 and is charged with the ion-exchange resin 31. The hardness component remover 3 is arranged at a position that is at the front in the front-rear direction and at the right side in the left-right direction in a lower area of the housing 51. Thus, the saturated regeneration water generation vessel 4 is arranged above the hardness component remover 3, and the pool tank 2 is arranged above the saturated regeneration water generation vessel 4.

The hardness component remover 3 is connected to the drain pipe 56*b* by a drain hose 60 (the drain passage 7). The drain hose 60 (the drain passage 7) connects the upstream buffer space 34 to the drain pipe 56*b*. The hardness component remover 3 is connected to the saturated regeneration water generation vessel 4 by a regeneration water hose 61 (the regeneration water passage 6). The regeneration water hose 61 (the regeneration water passage 6) connects the saturated regeneration water generation vessel 4 to the downstream buffer space 33.

Figure 8:
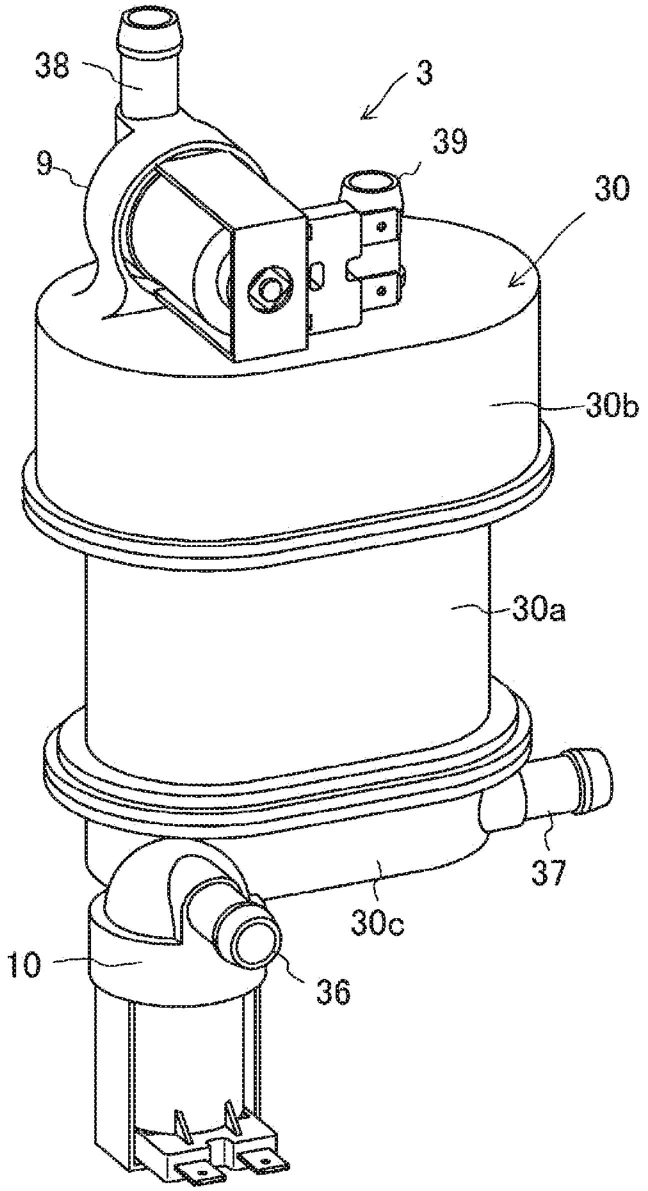
FIG. 8 is a schematic external view of a hardness component remover according to one or more embodiments of the present disclosure.
Figure 9:
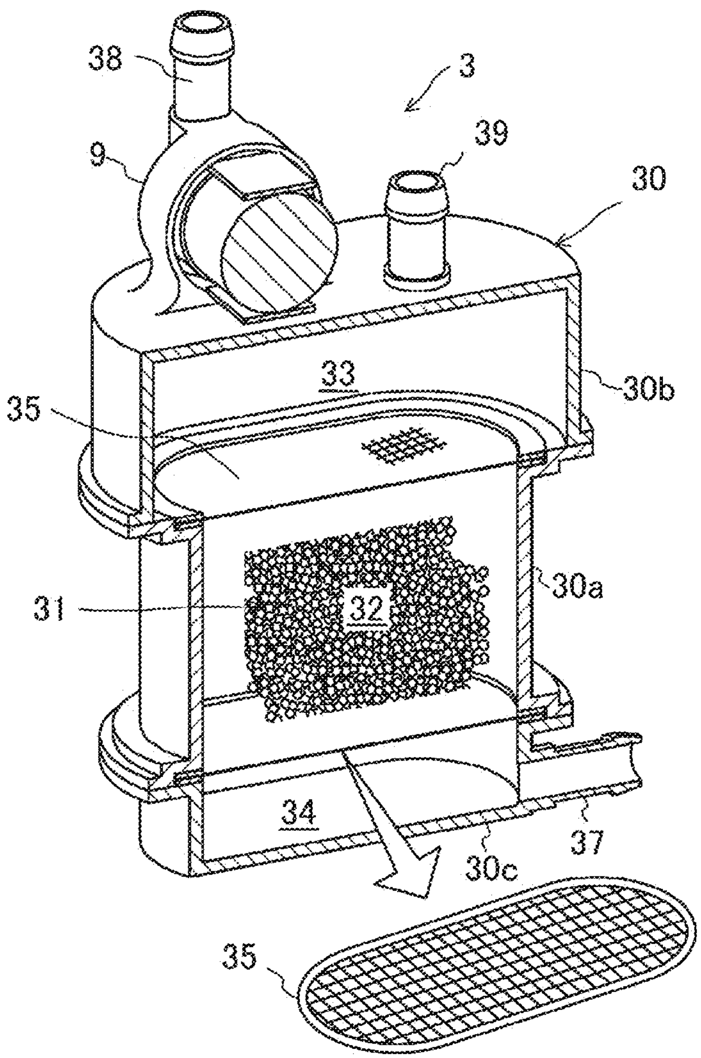
FIG. 9 is a schematic diagram of an internal structure of a hardness component remover according to one or more embodiments of the present disclosure.

FIG. 8 is a schematic external view of the hardness component remover 3 according to one or more embodiments of the present disclosure. FIG. 9 is a schematic diagram of an internal structure of the hardness component remover 3 according to one or more embodiments of the present disclosure. Referring to FIGS. 8 and 9, the hardness component remover 3 may include the case 30 integrally formed by resin molding. For example, the case 30 may include a tubular intermediate member 30*a* forming the resin charging chamber 32, and a cup-shaped upper member 30*b* and a cup-shaped lower member 30*c* respectively covering upper and lower openings of the intermediate member 30*a*.

The meshes 35 covering a water passage are disposed in the upper and lower openings of the intermediate member 30*a*. The mesh 35 has a mesh spacing that prevents particles of the ion-exchange resin 31 from leaking (e.g., 100 μm). The mesh spacing of the mesh 35 may be set considering the rate of drainage. In the resin charging chamber 32, the ion-exchange resin 31 is densely packed through a resin insertion port (not shown). For example, in the present embodiment, the volume of the ion-exchange resin 31 is 134 ml.

The downstream buffer space 33 is formed inside the upper member 30*b*, and the upstream buffer space 34 is formed inside the lower member 30*c*. A drain port 36 connected to the drain hose 60, and a water intake port 37 connected to an upstream portion of a treated water hose 63 (the treated water passage 5; to be described below) are disposed in the lower member 30*c*. The second on-off valve 10 is at the drain port 36.

An inlet 38 to which the regeneration water hose 61 is connected, and an outlet 39 to which a downstream portion of the treated water hose 63 is connected are disposed in the upper member 30*b*. The first on-off valve 9 is at the inlet 38.

Referring back to FIG. 6, a water supply pipe 62 is disposed inside the housing 51 to supply water to the tub 52. The water supply valves 13 (the first water supply valve 13*a* and the second water supply valve 13*b*) are disposed on the left rear side of an upper area of the housing 51.

The water supply valves 13 are connected to an external water pipe that is a water supply source, for example, the water tap 100, such that tap water is supplied to the washing machine 50 through the water supply valves 13. The treated water hose 63 forming the treated water passage 5 is connected to the first water supply valve 13*a*. An untreated water hose 64 forming the untreated water passage 14 is connected to the second water supply valve 13*b*.

The untreated water hose 64 is connected to an upper portion of the tub 52 via the pool tank 2. Thus, when the second water supply valve 13*b* is opened, tap water may be supplied to the pool tank 2 and the tub 52.

An upstream portion 63*a* of the treated water hose 63 is connected to the hardness component remover 3. A downstream portion 63*b* of the treated water hose 63 is connected to the water supply plate 57*c*. Thus, when the first water supply valve 13*a* is opened, softened tap water may be supplied to the tub 52 via the hardness component remover 3 and the detergent supply case 57.

As such, the washing machine 50 may differentiate between soft water and hard water for use. For example, in a washing process (wash cycle) using a detergent, a cleaning effect may be improved by using soft water. In a rinsing process (rinse cycle), the regeneration frequency of the ion-exchange resin 31 may be reduced by using hard water.

The regenerant is a consumable. When there is no regenerant in the regenerant accommodation chamber 40, or when the amount of regenerant remaining in the regenerant accommodation chamber 40 is reduced, it is necessary to replenish the regenerant in order to perform a regeneration process.

There may be a difference in the regeneration level of the ion-exchange resin 31 between a regeneration process performed immediately after replenishing the regenerant in the regenerant accommodation chamber 40 (the first regeneration process performed after replenishment), and the subsequent regeneration processes (the second and subsequent regeneration processes).

Figure 10:
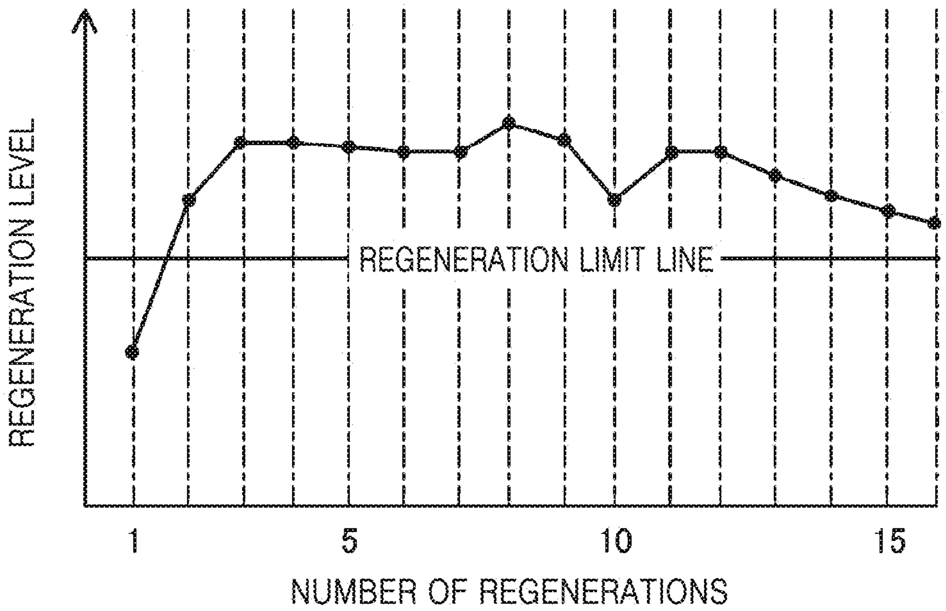
FIG. 10 is a graph showing a relationship between a regeneration level of an ion-exchange resin and the number of regenerations performed after replenishment of a regenerant.

FIG. 10 is a graph showing a relationship between the regeneration level of the ion-exchange resin 31 and the number of regenerations performed after replenishment of a regenerant. The regeneration limit line indicates the lower limit of a permissible regeneration level. As shown in FIG. 10, good regeneration levels exceeding the regeneration limit line may be stably obtained through the second-time and subsequent regeneration processes, whereas the regeneration level in the first-time regeneration process falls significantly below the regeneration limit line. This is because, in the first-time regeneration process, the amount of saturated regeneration water injected into the downstream buffer space 33 is small.

The regenerant is granular as described above. However, once the regeneration process is performed and the regenerant is submerged in water, particles of the regenerant clump together and form a mass. Accordingly, the surface area of the regenerant in the second-time and subsequent regeneration processes becomes smaller than the surface area of the regenerant in the first-time regeneration process. As a result, in the first-time regeneration process, the amount of saturated regeneration water captured between particles of the regenerant increases, and thus, the amount of saturated regeneration water flowing down from the saturated regeneration water generation vessel 4 to the downstream buffer space 33 decreases.

In the washing machine 50 according to one or more embodiments of the present disclosure, control of a regeneration process is performed so as to suppress a decrease in the regeneration level immediately after replenishment of a regenerant. The control device 12 performs control (control of an increase in the amount of water supplied) to increase the amount of water supplied to the saturated regeneration water generation vessel 4 when a regenerant is injected into the regenerant accommodation chamber 40 to generate saturated regeneration water for the first time (in the first-time regeneration process), compared to when saturated regeneration water is generated thereafter (in the second-time and subsequent regeneration processes).

Figure 11:
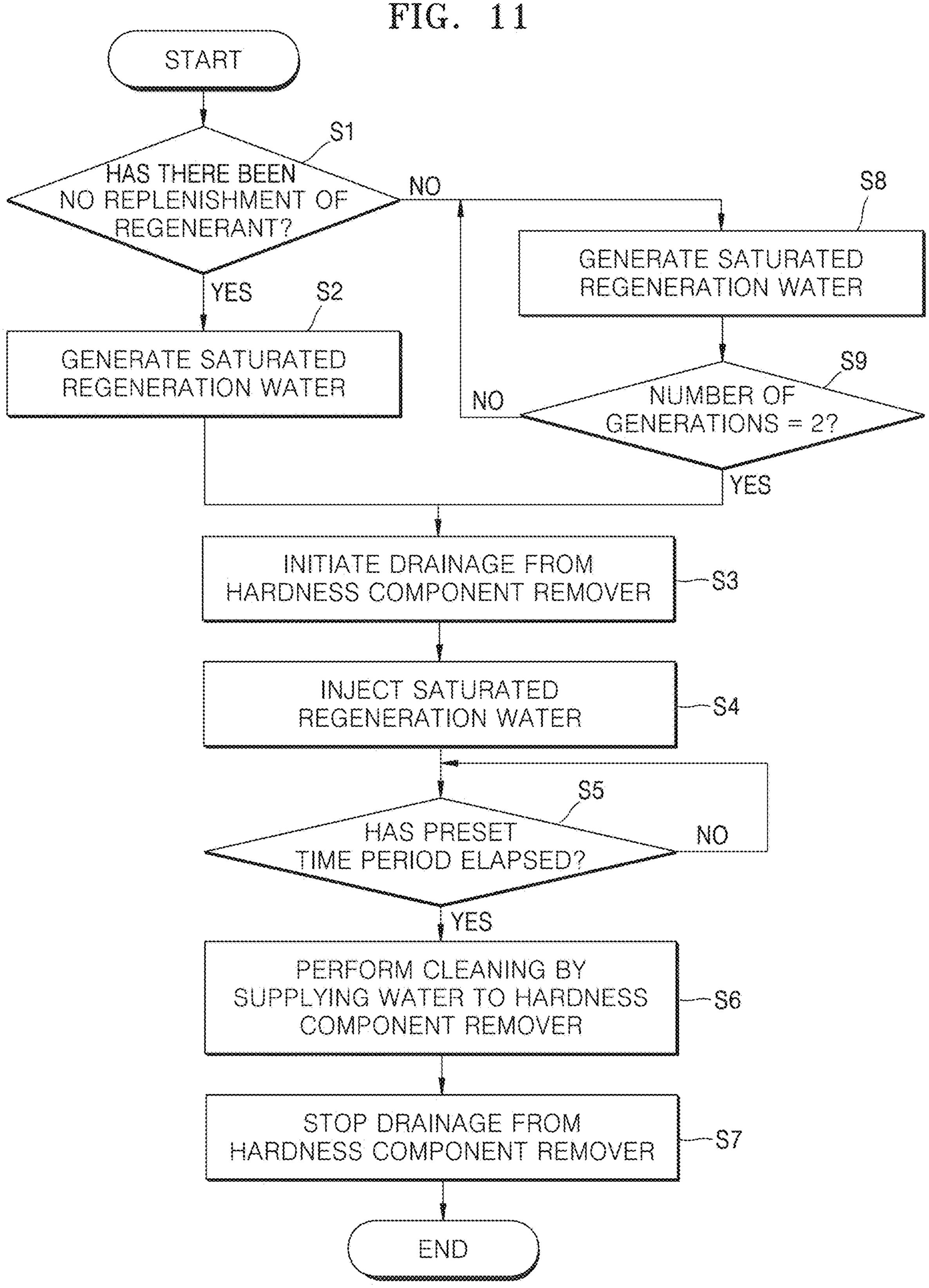
FIG. 11 is a flowchart of controlling a regeneration process according to one or more embodiments of the present disclosure.

FIG. 11 is a flowchart of controlling a regeneration process according to one or more embodiments of the present disclosure. In a regeneration process according to the present embodiment, when the regeneration process is performed immediately after replenishment of a regenerant, generation of saturated regeneration water is performed twice to increase the amount of saturated regeneration water collected in the regenerant accommodation chamber 40 through control of an increase in the amount of water supplied. Through the control of the increase in the amount of water supplied, the decline in the regeneration level is suppressed.

When the regeneration process is initiated, the control device 12 determines whether there has been replenishment of a regenerant before the current regeneration process (operation S1). For example, the control device 12 may determine whether the regenerant accommodation chamber 40 has been replenished with a regenerant, based on a user input via the manipulation panel 51*b*. That is, as described above, the user may determine the remaining amount of regenerant in the regenerant accommodation chamber 40 through the window 15, and when replenishment is required, replenish a regenerant.

The manipulation panel 51*b* may include a button (a replenishment manipulation button) to be manipulated when a regenerant has been replenished. In a case in which the manipulation panel 51*b* includes a touch panel display, a replenishment manipulation button may be displayed on the touch panel display. As the user manipulates the replenishment manipulation button after replenishing a regenerant, a predetermined signal (a replenishment signal) is input to the control device 12 from the manipulation panel 51*b*. The control device 12 may determine whether a regenerant has been replenished, according to whether a replenishment signal is input.

When it is determined that there has been no replenishment of a regenerant, the control device 12 performs a normal regeneration process. That is, the control device 12 generates saturated regeneration water by opening the third on-off valve 11 to supply water from the pool tank 2 to the saturated regeneration water generation vessel 4, for example, once (operation S2). Because the saturated regeneration water has a high concentration (e.g., about 25%), its production volume is small. For example, in the washing machine 50 of the present embodiment, the amount of saturated regeneration water is about 65 ml. Next, the control device 12 initiate drainage from the hardness component remover 3 by opening the second on-off valve 10 (operation S3). Next, the control device 12 injects the saturated regeneration water into the hardness component remover 3 by opening the first on-off valve 9 (operation S4). As described above, a timing for opening the first on-off valve 9 may be a timing at which, after opening the second on-off valve 10, the amount of water discharged from the hardness component remover 3 is equal to the amount of saturated regeneration water to be injected into the downstream buffer space 33.

In the downstream buffer space 33, residual water and the saturated regeneration water are mixed with each other to generate conditioned regeneration water, that is, salt water with a concentration of about 10%, and the ion-exchange resin 31 is regenerated by passing the conditioned regeneration water through the resin charging chamber 32. When a preset time period has elapsed from initiation of the injection of the saturated regeneration water ('YES' in operation S5), drainage of the conditioned regeneration water from the hardness component remover 3 is completed. The control device 12 performs a cleaning process of cleaning the ion-exchange resin 31 by supplying water to the hardness component remover 3 (operation S6). The control device 12 supplies water from the water supply source to the hardness component remover 3 in a state in which the first on-off valve 9 is closed and the second on-off valve 10 is opened. The water cleans the ion-exchange resin 31 and the interior of the hardness component remover 3, and is discharged through the drain passage 7 and drain pipe 56*b*. When the cleaning process is completed, the control device 12 stops the drainage from the hardness component remover 3 by closing the second on-off valve 10 (operation S7). The regeneration process is terminated.

In addition, when it is determined that there has been replenishment of a regenerant ('NO' in operation S1), the control device 12 supplies water from the pool tank 2 to the saturated regeneration water generation vessel 4 twice such that the amount of saturated regeneration water increases (control of an increase in the amount of water supplied). That is, operation S8, which is the same as to operation S2, is performed twice (operation S9). When the amount of saturated regeneration water is increased, the control device 12 performs a normal process. That is, operations S3 to S7 are performed.

Embodiments of the water softening device and the washing machine according to the present disclosure are not limited to the embodiments described above, and may include other components not mentioned in the embodiments described above.

For example, the water softening device according to the present disclosure may be applied not only to washing machines but also to dishwashers.

In the embodiments described above, the flow directions of water passing through the hardness component remover 3 in the water softening process and the regeneration process are opposite to each other, but they may also be the same direction.

In the embodiments described above, the pool tank 2 is provided in a flow path through which tap water flows, that is, the untreated water passage 14, but the pool tank 2 may also be disposed in a flow path through which soft water flows, specifically, on the downstream side of the treated water passage 5.

By using a 3-way valve as the first on-off valve 9 and connecting the regeneration water supply passage 8 to this valve, the third on-off valve 11 may be omitted.

In the control of an increase in the amount of water supplied in the embodiment described above, it is determined, based on a user input, whether there has been replenishment of a regenerant, but it is also possible to automatically determine whether there has been replenishment of a regenerant. For example, referring to FIG. 1, a sensor 70 may be provided to detect the amount of regenerant accommodated in the saturated regeneration water generation vessel 4 (e.g., the regenerant accommodation chamber 40). For example, the sensor 70 may detect the level of a regenerant inside the saturated regeneration water generation vessel 4. Based on a signal input from the sensor 70, the control device 12 may determine whether a regenerant has been replenished into the saturated regeneration water generation vessel 4. In this case, it may be automatically determined whether there has been replenishment of a regenerant, and thus, user convenience may be improved.

In the embodiments described above, the hardness component remover 3 having buffer spaces on and below the resin charging chamber is used, however, even in a case in which the hardness component remover does not have a buffer space, members corresponding to the buffer spaces may be arranged on and below the resin charging chamber separately from the hardness component remover.

The present disclosure relates to a water softening device for softening hard water supplied from a water supply source, and supplying the softened water to a water intake point, for example, a detergent supply case or a tub, and a washing machine using the water softening device.

According to an aspect of the present disclosure, a washing machine includes: a housing; a tub accommodated in the housing; a drum rotatable inside the tub and in which laundry is accommodated; a detergent supply case to mix a detergent accommodated therein with water, and supply a resulting mixture to the tub; a hardness component remover that is arranged in a treated water passage between a water supply source and the detergent supply case, and configured to soften hard water supplied from the water supply source and supply the softened water to the detergent supply case, the hardness component remover including a downstream buffer space, an upstream buffer space, and a resin charging chamber that is arranged between the downstream buffer space and the upstream buffer space and filled with an ion-exchange resin; a saturated regeneration water generation vessel in which saturated regeneration water with a regenerant dissolved therein at a saturation concentration is generated; a regeneration water passage connecting the saturated regeneration water generation vessel to the downstream buffer space; a drain passage connecting the upstream buffer space to a drain pipe; a first on-off valve to open and close the regeneration water passage; a second on-off valve to open and close the drain passage; and a control device configured to perform a regeneration process to regenerate the ion-exchange resin by supplying the saturated regeneration water to the hardness component remover, wherein the control device is further configured to control the first on-off valve and the second on-off valve such that, in the regeneration process, the saturated regeneration water is mixed with water inside the downstream buffer space to generate conditioned regeneration water having a regeneration concentration less than the saturation concentration, and the conditioned regeneration water passes through the ion-exchange resin.

In one or more embodiments, the control device may be further configured to, in the regeneration process, first initiate drainage from the hardness component remover by opening the second on-off valve, and in a state in which water remains in the downstream buffer space, generate the conditioned regeneration water by opening the first on-off valve to inject the saturated regeneration water from the saturated regeneration water generation vessel into the downstream buffer space and mix the saturated regeneration water with the residual water.

Water (usually soft water) is collected in the downstream buffer space arranged downstream of the resin charging chamber. When regenerating the ion-exchange resin, some of the water in the downstream buffer space is drained, and saturated regeneration water with a constant concentration is injected into the downstream buffer space. By mixing the residual water with saturated regeneration water in the downstream buffer space, conditioned regeneration water with a certain concentration is generated. By this, the regenerant may be adjusted to a desired concentration relatively stably. The ion-exchange resin may be efficiently regenerated by passing the conditioned regeneration water through the resin charging chamber in a process of draining the conditioned regeneration water from the hardness component remover. In addition, the regeneration process may be performed in a short time period.

In one or more embodiments, the control device may be further configured to open the first on-off valve at a timing when, after opening the second on-off valve, an amount of water discharged from the hardness component remover is equal to an amount of saturated regeneration water to be injected into the downstream buffer space. Accordingly, the downstream buffer space may be formed to have a bare minimum size. In addition, in general, the ion-exchange resin swells or shrinks, and thus, small spaces considering the swelling or shrinking are provided above and below the resin charging chamber of the hardness component remover. Thus, the space may be used as the downstream buffer space, enabling a low-cost water softening device.

For example, the regenerant may contain sodium chloride, and the concentration of sodium chloride in the conditioned regeneration water may be 10%. The downstream buffer space may be formed to have a size for generating conditioned regeneration water containing more sodium chloride than is necessary for regeneration of the ion-exchange resin. Accordingly, conditioned regeneration water containing sodium chloride in an amount corresponding to the amount of ion-exchange resin charged in the resin charging chamber, and having an optimal regeneration concentration for regeneration may be generated. Thus, the ion-exchange resin may be regenerated without excess or deficiency.

For example, the rate of drainage from the hardness component remover may be less than the rate of injection of the saturated regeneration water into the hardness component remover. Accordingly, in the downstream buffer space, the residual soft water and the saturated regeneration water may be sufficiently mixed with each other, and conditioned regeneration water with a relatively uniform concentration may be generated in the downstream buffer space. Thus, the conditioned regeneration water with an optimal concentration may be supplied to the resin charging chamber.

For example, the cross-sectional area of a flow path of the drain passage may be greater than the cross-sectional area of a flow path of the regeneration water passage. The ion-exchange resin generally includes small-diameter spheres, and fine meshes are arranged on the upper and lower boundaries of the resin charging chamber to prevent the ion-exchange resin from leaking. When the mesh is tightly woven, the surface tension becomes stronger, which affects drainage. In order to improve drainage, the cross-sectional area of a flow path of a drain channel may be made greater than the cross-sectional area of a flow path of the regeneration water passage. Accordingly, the regeneration water containing Ca ions or Mg ions is discharged without being collected in the upstream buffer space, through exchange with the ion-exchange resin, enabling efficient regeneration.

In one or more embodiments, the control device may be further configured to, based on completion of the drainage of the conditioned regeneration water from the hardness component remover, perform a cleaning process of cleaning the ion-exchange resin by supplying water to the hardness component remover from the water supply source in a state in which the first on-off valve is closed and the second on-off valve is opened. Accordingly, Ca ions or Mg ions remaining inside the hardness component remover or attached to the ion-exchange resin may be discharged, and thus, it is possible to reduce or prevent deterioration of the water softening performance of the ion-exchange resin after regeneration.

For example, the downstream buffer space may be arranged above the resin charging chamber, and the upstream side buffer space may be arranged below the resin charging chamber. Accordingly, the conditioned regeneration water may flow from the downstream buffer space through the resin charging chamber to the upstream buffer space by gravity, and may be discharged through the drain passage.

In one or more embodiments, the saturated regeneration water generation vessel may include a regenerant accommodation chamber to accommodate the regenerant, and the saturated regeneration water may be generated in the saturated regeneration water generation vessel by water supplied from the water supply source. Accordingly, there is no need to secure a separate time period other than for a washing process for generating saturated regeneration water, and thus, the regeneration process may be efficiently performed.

In one or more embodiments, the washing machine may further include: a pool tank to store water and connected to the water supply source; a regeneration water supply passage connecting the pool tank to the saturated regeneration water generation vessel; and a third on-off valve to open and close the regeneration water supply passage. The control device may generate saturated regeneration water by controlling the third on-off valve to supply water to the saturated regeneration water generation vessel.

For example, the saturated regeneration water generation vessel may be arranged above the hardness component remover, and the pool tank may be arranged above the saturated regeneration water generation vessel. Accordingly, water may be supplied by using gravity in the regeneration process, and thus, there is no need to use a pump or the like, which may reduce part costs.

In one or more embodiments, the control device may be further configured to, in the regeneration process performed for the first time after the regenerant is replenished in the saturated regeneration water generation vessel, perform water supply increase control such that an amount of water supplied to the saturated regeneration water generation vessel is larger than in the regeneration process performed for the second and subsequent times. There may be a difference in the regeneration level of the ion-exchange resin between immediately after replenishment of the regenerant and thereafter, and such an issue may be suppressed by performing, in the first-time regeneration process, control of an increase in the amount of water supplied.

For example, a window may be arranged in the housing such that an interior of the saturated regeneration water generation vessel is visible. The remaining amount of regenerant in the saturated regeneration water generation vessel may be easily checked through the window.

In one or more embodiments, the control device may be further configured to determine whether the regenerant has been replenished in the saturated regeneration water generation vessel, based on a user input through a manipulation panel.

In one or more embodiments, the washing machine may further include a sensor configured to detect the amount of the regenerant accommodated in the saturated regeneration water generation vessel. The control device may be further configured to determine whether the regenerant has been replenished in the saturated regeneration water generation vessel, based on a signal input from the sensor. It may be automatically determined whether the regenerant has been replenished, and thus, user convenience may be improved.

According to an aspect of the present disclosure, a water softening device for softening hard water supplied from a water supply source, and supplying the softened water to a certain water intake point includes: a hardness component remover arranged in a treated water passage between the water supply source and the water intake point and in which an ion-exchange resin is accommodated; a saturated regeneration water generation vessel connected between the hardness component remover and a regeneration water passage to generate saturated regeneration water in which a certain regenerant is dissolved at a saturation concentration; a first on-off valve disposed in the regeneration water passage; a second on-off valve disposed in a drain passage through which water is discharged from the hardness component remover; and a control device configured to perform a regeneration process of regenerating the ion-exchange resin. The hardness component remover includes: a resin charging chamber charged with the ion-exchange resin; a downstream buffer space in communication with a downstream side of the treated water passage and the regeneration water passage; and an upstream buffer space in communication with an upstream side of the treated water passage and the drain passage. The control device is further configured to, when performing the regeneration process, initiate drainage from the hardness component remover by opening the second on-off valve, inject a certain amount of the saturated regeneration water from the saturated regeneration water generation vessel into the downstream buffer space by opening the first on-off valve in a state in which a certain amount of water remains in the downstream buffer space, and cause resulting mixed water of the saturated regeneration water and residual water to pass through the resin charging chamber.

For example, the regenerant may be sodium chloride, the mixed water generated in the downstream buffer space may be conditioned to have a concentration of sodium chloride of 10%, and the downstream buffer space may be formed to a size for generating the mixed water containing sodium chloride in an amount greater than that necessary for regeneration of the ion-exchange resin.

In one or more embodiments, the hardness component remover may be designed such that the drainage from the hardness component remover is performed at a lower rate than the injection of the saturated regeneration water into the hardness component remover.

In one or more embodiments, the first on-off valve may be opened at a timing when the amount of water discharged from the hardness component remover is equal to the amount of the saturated regeneration water to be injected into the downstream buffer space.

For example, the cross-sectional area of a flow path of the drain passage may be greater than the cross-sectional area of a flow path of the regeneration water passage.

According to the embodiments of water softening devices, it is possible to implement a water softening device having a relatively simple configuration and capable of stably generating regeneration water having a concentration optimal for regeneration of an ion-exchange resin. In addition, by applying the water softening device to a washing machine, the decline in cleaning power may be suppressed even when performing laundry with hard water depending on a region. The water softening device may also be applied to dishwashers.

Although the water softening device and the washing machine using the same according to the present disclosure have been described with the limited embodiments and the drawings, various modifications and changes may be made by those of skill in the art from the above description.

What is claimed is:

1. A washing machine comprising:

a housing;

a tub in the housing;

a drum rotatable inside the tub;

a detergent supply case to mix a detergent with water, and supply a resulting mixture to the tub;

a hardness component remover in a treated water passage between a water supply source and the detergent supply case, and configured to soften hard water supplied from the water supply source and supply softened water to the detergent supply case, the hardness component remover comprising:

a downstream buffer space;

an upstream buffer space; and a resin charging chamber between the downstream buffer space and the upstream buffer space and containing an ion-exchange resin;

a saturated regeneration water generation vessel in which saturated regeneration water with a regenerant dissolved therein at a saturation concentration is to be generated;

a regeneration water passage connecting the saturated regeneration water generation vessel to the downstream buffer space;

a drain passage connecting the upstream buffer space to a drain;

a first on-off valve to open and close the regeneration water passage;

a second on-off valve to open and close the drain passage;

at least one processor; and memory storing instructions that, when executed by the at least one processor, cause the at least one processor to:

perform a regeneration process to regenerate the ion-exchange resin by supplying the saturated regeneration water to the hardness component remover; and control the first on-off valve and the second on-off valve such that, in the regeneration process, the saturated regeneration water is mixed with water inside the downstream buffer space to generate conditioned regeneration water having a regeneration concentration less than the saturation concentration, and the conditioned regeneration water passes through the ion-exchange resin.

2. The washing machine of claim 1, wherein the instructions further cause the at least one processor to, in the regeneration process, first initiate drainage from the hardness component remover by opening the second on-off valve, and in a state in which the water remains in the downstream buffer space, generate the conditioned regeneration water by opening the first on-off valve to inject the saturated regeneration water from the saturated regeneration water generation vessel into the downstream buffer space and mix the saturated regeneration water with remaining water.

3. The washing machine of claim 2, wherein the instructions further cause the at least one processor to open the first on-off valve at a timing when, after opening the second on-off valve, an amount of water discharged from the hardness component remover is equal to an amount of saturated regeneration water to be injected into the downstream buffer space.

4. The washing machine of claim 1,
wherein the regenerant contains sodium chloride, and
wherein a concentration of sodium chloride in the conditioned regeneration water is 10%.

5. The washing machine of claim 1, wherein a rate of drainage from the hardness component remover is less than a rate of injection of the saturated regeneration water into the hardness component remover.

6. The washing machine of claim 1, wherein a cross-sectional area of a flow path of the drain passage is greater than a cross-sectional area of a flow path of the regeneration water passage.

7. The washing machine of claim 1, wherein the instructions further cause the at least one processor to, based on completion of drainage of the conditioned regeneration water from the hardness component remover, perform a cleaning process of cleaning the ion-exchange resin by supplying the water from the water supply source to the hardness component remover in a state in which the first on-off valve is closed and the second on-off valve is opened.

8. The washing machine of claim 1,
wherein the downstream buffer space is above the resin charging chamber, and
wherein the upstream buffer space is below the resin charging chamber.

9. The washing machine of claim 1,
wherein the saturated regeneration water generation vessel comprises a regenerant accommodation chamber to accommodate the regenerant, and
wherein the saturated regeneration water is generated in the saturated regeneration water generation vessel by the water supplied from the water supply source.

10. The washing machine of claim 9, further comprising:
a pool tank connected to the water supply source and configured to store the water supplied from the water supply source;
a regeneration water supply passage connecting the pool tank to the saturated regeneration water generation vessel; and
a third on-off valve to open and close the regeneration water supply passage.

11. The washing machine of claim 10,
wherein the saturated regeneration water generation vessel is above the hardness component remover, and
wherein the pool tank is above the saturated regeneration water generation vessel.

12. The washing machine of claim 1, wherein the instructions further cause the at least one processor to, in the regeneration process performed for a first time after the regenerant is replenished in the saturated regeneration water generation vessel, perform water supply increase control such that an amount of water supplied to the saturated regeneration water generation vessel is larger than in the regeneration process performed for a second time and subsequent times.

13. The washing machine of claim 12, wherein a window is in the housing such that an interior of the saturated regeneration water generation vessel is visible.

14. The washing machine of claim 12, wherein the instructions further cause the at least one processor to determine whether the regenerant has been replenished in the saturated regeneration water generation vessel, based on a user input through a manipulation panel.

15. The washing machine of claim 12, further comprising:
a sensor configured to detect an amount of the regenerant accommodated in the saturated regeneration water generation vessel,
wherein the instructions further cause the at least one processor to determine whether the regenerant has been replenished in the saturated regeneration water generation vessel, based on a signal input from the sensor.

16. A washing machine comprising:
a washing vessel;
a detergent supply case to mix a detergent with water, and supply a resulting mixture to the washing vessel;
a hardness component remover in a treated water passage between a water supply source and the detergent supply case, and configured to soften hard water supplied from the water supply source and supply softened water to the detergent supply case, the hardness component remover comprising a resin charging chamber containing an ion-exchange resin;
a saturated regeneration water generation vessel in which saturated regeneration water with a regenerant dissolved therein at a saturation concentration is to be generated;
at least one processor; and
memory storing instructions that when executed by the at least one processor, cause the at least one processor to:
control the washing machine to supply the softened water and the detergent to the washing vessel during a wash cycle;
control the washing machine to supply the hard water supplied from the water supply source to the washing vessel during a rinse cycle;
perform a regeneration process to regenerate the ion-exchange resin by supplying the saturated regeneration water to the hardness component remover;
control the washing machine such that, in the regeneration process, the saturated regeneration water is mixed with water to generate conditioned regeneration water having a regeneration concentration less than the saturation concentration, and the conditioned regeneration water passes through the ion-exchange resin; and
in the regeneration process performed for a first time after the regenerant is replenished in the saturated regeneration water generation vessel, perform water supply increase control such that an amount of water supplied to the saturated regeneration water generation vessel is larger than in the regeneration process performed for a second and subsequent times.

* * * * *